United States Patent
Kang et al.

(10) Patent No.: US 8,852,045 B2
(45) Date of Patent: Oct. 7, 2014

(54) ELECTRIC OIL PUMP SYSTEM AND CONTROL METHOD THEREOF

(71) Applicants: Hyundai Motor Company, Seoul (KR); Kia Motors Corporation, Seoul (KR)

(72) Inventors: Seung Jae Kang, Seoul (KR); Sang Hyun Jeong, Hwaseong-si (KR); Jong Hyun Kim, Suwon-si (KR); Hak Sung Lee, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 24 days.

(21) Appl. No.: 13/845,866

(22) Filed: Mar. 18, 2013

(65) Prior Publication Data

US 2014/0187382 A1    Jul. 3, 2014

(30) Foreign Application Priority Data

Dec. 28, 2012  (KR) .......................... 10-2012-0156615

(51) Int. Cl.
*F16H 31/00*  (2006.01)
*F16H 57/04*  (2010.01)
*F16H 61/00*  (2006.01)

(52) U.S. Cl.
CPC ........ *F16H 57/0434* (2013.01); *F16H 61/0031* (2013.01)
USPC .......................................................... 475/117

(58) Field of Classification Search
USPC ............................................................ 477/98
See application file for complete search history.

(56) References Cited

U.S. PATENT DOCUMENTS

| | | | |
|---|---|---|---|
| 2009/0242290 A1* | 10/2009 | Kobayashi | 180/65.265 |
| 2012/0063920 A1* | 3/2012 | Ikeda | 417/32 |
| 2012/0083978 A1* | 4/2012 | Tajima et al. | 701/55 |
| 2013/0173104 A1* | 7/2013 | Miyamoto et al. | 701/22 |

FOREIGN PATENT DOCUMENTS

| | | |
|---|---|---|
| JP | 2008-128204 A | 6/2008 |
| JP | 2012-57764 A | 3/2012 |
| JP | 2012-140911 A | 7/2012 |
| KR | 10-2009-0110673 A | 10/2009 |
| KR | 10-1044235 B1 | 6/2011 |
| KR | 10-2011-0107975 A | 10/2011 |

* cited by examiner

*Primary Examiner* — Dirk Wright
(74) *Attorney, Agent, or Firm* — Morgan, Lewis & Bockius LLP

(57) ABSTRACT

An electric oil pump system and a control method thereof include an electrical oil pump that is derated or the derating of the electrical oil pump is released according to a coil temperature of the electrical oil pump, and a torque of a transmission is control according to whether or not the electrical oil pump is derated.

10 Claims, 3 Drawing Sheets

ELECTRIC OIL PUMP SYSTEM AND CONTROL METHOD THEREOF

CROSS-REFERENCE TO RELATED APPLICATION

The present application claims priority of Korean Patent Application Number 10-2012-0156615 filed Dec. 28, 2012, the entire contents of which application is incorporated herein for all purposes by this reference.

BACKGROUND OF INVENTION

1. Field of Invention

The present invention relates to an electric oil pump system and a control method thereof.

2. Description of Related Art

In a motor of an electrical oil pump (EOP) including a motor as disclosed in Patent Document 1, fatal damage to main elements such as a coil, a printed circuit board, and a permanent magnet due to heat generation caused by overcurrent may occur.

Particularly, in a system of supplying oil by only an electrical oil pump, since damage of the electrical oil pump causes a stop of a vehicle, it is important to prevent the damage of the electrical oil pump in advance.

An electrical oil pump controlling unit (EOP CU) serves to drive the electrical oil pump and performs a control to raise a phase current value at the time of generation of an overload in the electrical oil pump, such that the electrical oil pump may be rotated while enduring the load at a large torque.

The high phase current applied from the electrical oil pump controlling unit to the electrical oil pump rapidly raises a coil temperature of the electrical oil pump. In the case in which the coil temperature rises to a specific temperature or more, damage to the main elements of the electrical oil pump may occur.

In addition, secondary damage to a transmission may occur due to a decrease in line pressure according to a decrease in a supply flow rate caused by the damage to the electrical oil pump.

An exemplar of the prior art is KR 10-2009-0039327 A.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for an electric oil pump system for derating an electrical oil pump according to a coil temperature of the electrical oil pump, and a control method thereof.

In one aspect of the present invention, there is provided an electrical oil pump system including: an electrical oil pump including a coil; a temperature sensor measuring a coil temperature of the electrical oil pump; an electrical oil pump controller derating the electrical oil pump or releasing the derating of the electrical oil pump according to the coil temperature of the electrical oil pump measured by the temperature sensor and requesting a transmission controller to control a torque of a transmission according to whether or not the electrical oil pump is derated; and a transmission controller decreasing the torque of the transmission or releasing the decrease of the torque thereof according to the derating of the electrical oil pump or the release of the derating of the electrical oil pump in the electrical oil pump controller.

The electrical oil pump controller may compare the coil temperature of the electrical oil pump measured by the temperature sensor with a preset reference temperature and derate the electrical oil pump in the case in which the coil temperature of the electrical oil pump exceeds the reference temperature.

The electrical oil pump controller may set a derating value of the electrical oil pump in consideration of a transmission demand torque and an output of the electrical oil pump and derate the electrical oil pump according to the set derating value.

The electrical oil pump controller may compare the coil temperature of the electrical oil pump measured by the temperature sensor with a preset coil saturation temperature and release the derating of the electrical oil pump in the case in which the coil temperature of the electrical oil pump is lower than the coil saturation temperature.

The electrical oil pump system may further include a phase current sensor monitoring a phase current applied to the electrical oil pump.

In another aspect of the present invention, there is provided a control method of an electrical oil pump in an electrical oil pump system including an electrical oil pump, an electrical oil pump controller, a temperature sensor, and a transmission controller, the control method including: measuring, by the electrical oil pump system, a coil temperature of the electrical oil pump and comparing the measured coil temperature with a reference temperature; derating the electrical oil pump in the case in which the coil temperature of the electrical oil pump exceeds the reference temperature as the comparison result; and decreasing a torque of a transmission as the electrical oil pump is derated.

The control method may further include, after the decreasing of the torque of the transmission, confirming whether or not the coil temperature of the electrical oil pump is lower than a preset coil saturation temperature; and releasing the derating of the electrical oil pump in the case in which the coil temperature of the electrical oil pump is lower than the coil saturation temperature as the confirmation result.

The control method may further include, after the releasing of the derating of the electrical oil pump, normally transferring the torque of the transmission as the derating of the electrical oil pump is released.

In the derating of the electrical oil pump, a derating value of the electrical oil pump may be set in consideration of a transmission demand torque and an output of the electrical oil pump and the electrical oil pump may be derated according to the set derating value.

The control method may further include, after the decreasing of the torque of the transmission, monitoring a phase current applied to the electrical oil pump.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
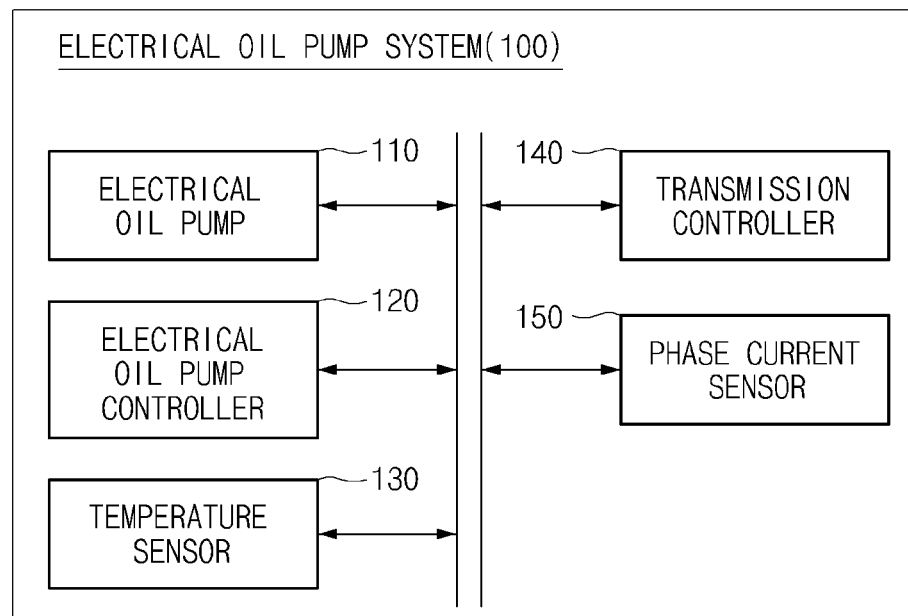
FIG. 1 is a view showing a configuration of an exemplary electrical oil pump system according to the present invention in detail.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted. In the description, the terms "first", "second", and so on are used to distinguish one element from another element, and the elements are not defined by the above terms.

Hereinafter, various embodiments of the present invention will be described in detail with reference to the accompanying drawings.

Figure 3:
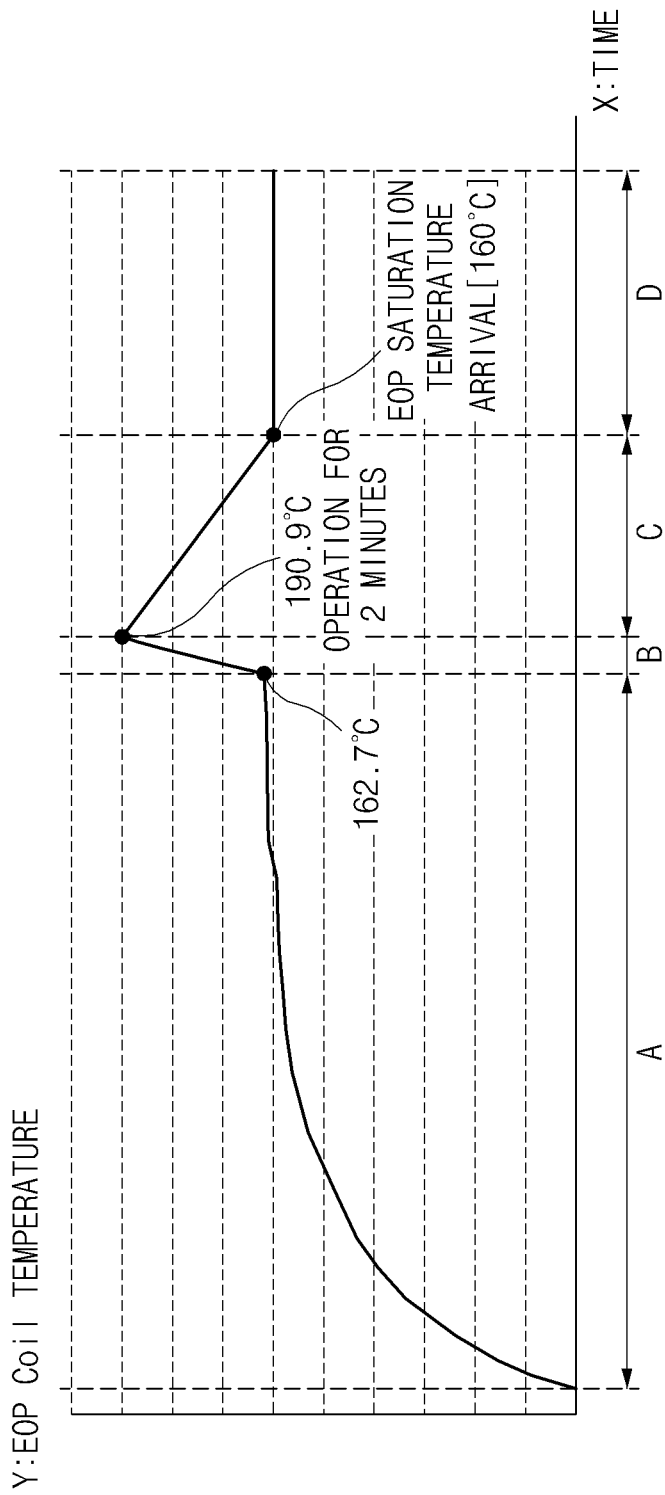
FIG. 3 is a graph for describing the exemplary control method of an electrical oil pump according to the present invention.

FIG. 1 is a view showing a configuration of an electrical oil pump system according to various embodiments of the present invention in detail, which will be described with reference to FIG. 3 showing a graph for describing the control method of an electrical oil pump.

As shown in FIG. 1, the electrical oil pump system 100 may be configured to include an electrical oil pump 110, an electrical oil pump controller 120, a temperature sensor 130, a transmission controller 140, and a phase current sensor 150.

More specifically, the electrical oil pump 110 may include a coil and supply oil to a transmission.

The temperature sensor 130 may measure a coil temperature of the electrical oil pump 110.

In addition, the electrical oil pump controller 120 may derate the electrical oil pump 110 or release the derating of the electrical oil pump 110 according to the coil temperature of the electrical oil pump 110 measured by the temperature sensor 130 and requests the transmission controller 140 to control a torque of the transmission according to whether or not the electrical oil pump 110 is derated.

More specifically, the electrical oil pump controller 120 may compare the coil temperature of the electrical oil pump 110 measured by the temperature sensor 130 with a preset reference temperature and derate the electrical oil pump 110 in the case in which the coil temperature of the electrical oil pump 110 exceeds the reference temperature.

Here, the reference temperature is defined as an arbitrarily set value in consideration of a temperature that may have a negative effect on main elements of the electrical oil pump 110.

In addition, the electrical oil pump controller 120 performs the derating for lowering a rated output by gradually decreasing a maximum torque when the coil temperature of the electrical oil pump exceeds the reference temperature.

In addition, the electrical oil pump controller 120 may set a derating value of the electrical oil pump 110 in consideration of a transmission demand torque and an output of the electrical oil pump and derate the electrical oil pump 110 according to the set derating value.

That is, the electrical oil pump 120 derates the electrical oil pump and set the derating value in consideration of a situation in which the transmission and the electrical oil pump operate. Here, the set derating value may be arbitrarily set by an operator.

In addition, the electrical oil pump controller 120 may compare the coil temperature of the electrical oil pump 110 measured by the temperature sensor 130 with a preset coil saturation temperature and release the derating of the electrical oil pump 110 in the case in which the coil temperature of the electrical oil pump 110 is lower than the coil saturation temperature.

For example, referring to FIG. 3, a section A means a normal section at the time of a continuous operation of the electrical oil pump, a section B means a coil temperature rising section due to an overload operation, a section C means a derating section of the electrical oil pump, and a section D means a stabilization arriving section.

Here, the electrical oil pump controller 120 derates the electrical oil pump 110 and decreases a torque of the transmission (section C), when the electrical oil pump 110 performs a rated continuous operation (section A) and then is in a saturation state in which a coil temperature is 162.7□, such that the coil temperature rises and the electrical oil pump 110 is thus in an overload condition state (section B).

In addition, the electrical oil pump controller 120 releases the derating of the electrical oil pump 110 and releases the torque decrease of the transmission (section D), when the coil temperature of the electrical oil pump 110 becomes lower than the coil saturation temperature.

In addition, the transmission controller 140 may decrease the torque of the transmission or release the decrease of the torque thereof according to the derating of the electrical oil pump 110 or the release of the derating of the electrical oil pump 110 in the electrical oil pump controller 120.

In addition, the phase current sensor 150 may monitor a phase current applied to the electrical oil pump.

Figure 2:
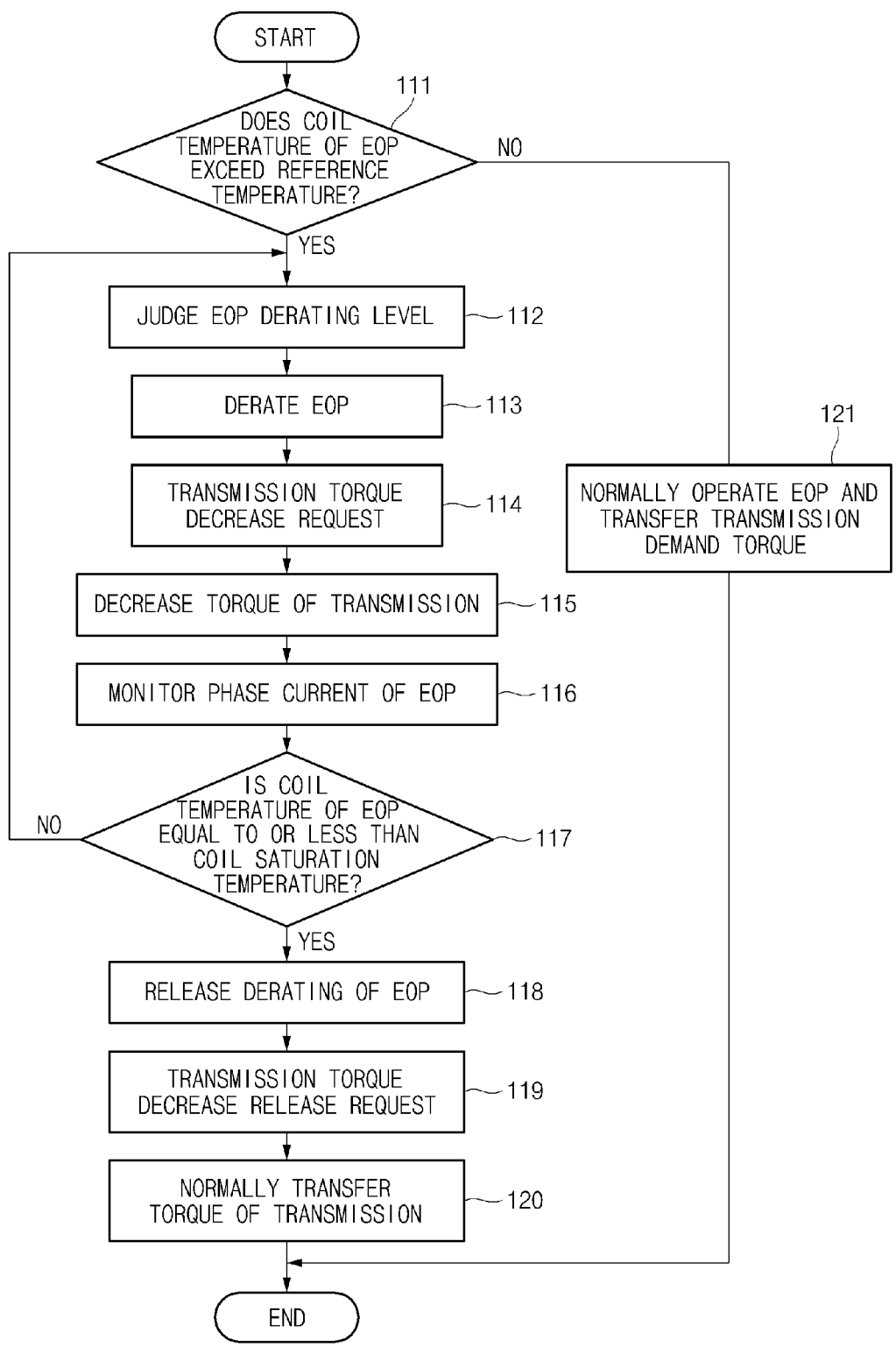
FIG. 2 is a flow chart for describing an exemplary control method of an electrical oil pump according to the present invention.

FIG. 2 is a flow chart for describing a control method of an electrical oil pump according to various embodiments of the present invention. Hereinafter, a control method of an electrical oil pump in the electrical oil pump system including the electrical oil pump, the electrical oil pump controller, the temperature sensor, and the transmission controller will be described.

In addition, the control method of an electrical oil pump will be described with reference to FIG. 3 showing the graph for describing the control method of an electrical oil pump.

First, as shown in FIG. 2, the electrical oil pump system may measure the coil temperature of the electrical oil pump and compare the measured coil temperature with the reference temperature (S111).

More specifically, as the temperature sensor 130 measures the coil temperature of the electrical oil pump 110, the electrical oil pump controller 120 compares the coil temperature of the electrical oil pump measured by the temperature sensor 130 with the preset reference temperature.

Here, the reference temperature is defined as an arbitrarily set value in consideration of a temperature that may have a negative effect on main elements of the electrical oil pump 110.

In the case in which the coil temperature of the electrical oil pump 110 exceeds the reference temperature as the comparison result, the electrical oil pump controller 120 may derate the electrical oil pump 110 (S112 and S113).

More specifically, the electrical oil pump controller 120 may set the derating value of the electrical oil pump in consideration of the transmission demand torque and the output of the electrical oil pump (S112) and derate the electrical oil pump 110 according to the set derating value (S113).

That is, the electrical oil pump 120 derates the electrical oil pump and set the derating value in consideration of a situation in which the transmission and the electrical oil pump operate. Here, the set derating value may be arbitrarily set by an operator.

Then, as the electrical oil pump 110 is derated, the transmission controller 140 may decrease the torque of the transmission (S114 and S115).

More specifically, when the electrical oil pump controller 120 transmits a transmission torque decrease request to the transmission controller 140 (S114) as it derates the electrical oil pump 110, the transmission controller 140 decreases the torque of the transmission (S115).

Next, the phase current sensor 150 may monitor the phase current applied to the electrical oil pump 110 (S116).

Next, whether or not the coil temperature of the electrical oil pump is lower than the preset coil saturation temperature may be confirmed (S117).

More specifically, as the temperature sensor 130 measures the coil temperature of the electrical oil pump 110, the electrical oil pump controller 120 compares the coil temperature of the electrical oil pump measured by the temperature sensor 130 with the preset coil saturation temperature.

In the case in which the coil temperature of the electrical oil pump 110 is lower than the coil saturation temperature as the confirmation result, the electrical oil pump controller 120 may release the derating of the electrical oil pump 110 (S118).

Thereafter, as the derating of the electrical oil pump 110 is released, the torque of the transmission may be normally transferred (S119 and S120).

More specifically, when the electrical oil pump controller 120 transmits a transmission torque decrease release request to the transmission controller 140 (S119) as it releases the derating of the electrical oil pump 110, the transmission controller 140 releases the decrease of the torque of the transmission (S120).

For example, referring to FIG. 3, a section A means a normal section at the time of a continuous operation of the electrical oil pump, a section B means a coil temperature rising section due to an overload operation, a section C means a derating section of the electrical oil pump, and a section D means a stabilization arriving section.

Here, the electrical oil pump controller 120 derates the electrical oil pump 110 and decreases a torque of the transmission (section C), when the electrical oil pump performs a rated continuous operation (section A) and then is in a saturation state in which a coil temperature is 162.7☐, such that the coil temperature rises and the electrical oil pump is thus in an overload condition state (section B).

In addition, the electrical oil pump controller 120 releases the derating of the electrical oil pump and releases the torque decrease of the transmission (section D), when the coil temperature of the electrical oil pump becomes lower than the coil saturation temperature.

Meanwhile, in the case in which the coil temperature of the electrical oil pump 110 does not exceed the reference temperature as the comparison result of S111, the electrical oil pump controller 120 may normally operate the electrical oil pump 110, and the transmission controller 140 may transfer the transmission demand torque (S121).

With the electric oil pump system and the control method thereof according to the various embodiments of the present invention, since the coil temperature of the electrical oil pump is measured in real time to control the electrical oil pump, main elements of the electrical oil pump may be protected. Therefore, stability in controlling a vehicle may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electrical oil pump system comprising:
    an electrical oil pump including a coil;
    a temperature sensor measuring a coil temperature of the electrical oil pump;
    an electrical oil pump controller derating the electrical oil pump or releasing the derating of the electrical oil pump according to the coil temperature of the electrical oil pump measured by the temperature sensor and requesting a transmission controller to control a torque of a transmission according to whether or not the electrical oil pump is derated; and
    a transmission controller decreasing the torque of the transmission or releasing the decrease of the torque thereof according to the derating of the electrical oil pump or the release of the derating of the electrical oil pump in the electrical oil pump controller.

2. The electrical oil pump system according to claim 1, wherein the electrical oil pump controller compares the coil temperature of the electrical oil pump measured by the temperature sensor with a preset reference temperature and derates the electrical oil pump in the case in which the coil temperature of the electrical oil pump exceeds the reference temperature.

3. The electrical oil pump system according to claim 2, wherein the electrical oil pump controller sets a derating value of the electrical oil pump in consideration of a transmission demand torque and an output of the electrical oil pump and derates the electrical oil pump according to the set derating value.

4. The electrical oil pump system according to claim 1, wherein the electrical oil pump controller compares the coil temperature of the electrical oil pump measured by the temperature sensor with a preset coil saturation temperature and releases the derating of the electrical oil pump in the case in which the coil temperature of the electrical oil pump is lower than the coil saturation temperature.

5. The electrical oil pump system according to claim 1, further comprising a phase current sensor monitoring a phase current applied to the electrical oil pump.

6. A control method of an electrical oil pump in an electrical oil pump system including an electrical oil pump, an electrical oil pump controller, a temperature sensor, and a transmission controller, the control method comprising:

measuring, by the electrical oil pump system, a coil temperature of the electrical oil pump and comparing the measured coil temperature with a reference temperature;

derating the electrical oil pump in the case in which the coil temperature of the electrical oil pump exceeds the reference temperature as the comparison result; and decreasing a torque of a transmission as the electrical oil pump is derated.

7. The control method according to claim 6, further comprising, after the decreasing of the torque of the transmission, confirming whether or not the coil temperature of the electrical oil pump is lower than a preset coil saturation temperature; and releasing the derating of the electrical oil pump in the case in which the coil temperature of the electrical oil pump is lower than the coil saturation temperature as the confirmation result.

8. The control method according to claim 7, further comprising, after the releasing of the derating of the electrical oil pump, normally transferring the torque of the transmission as the derating of the electrical oil pump is released.

9. The control method according to claim 6, wherein in the derating of the electrical oil pump, a derating value of the electrical oil pump is set in consideration of a transmission demand torque and an output of the electrical oil pump and the electrical oil pump is derated according to the set derating value.

10. The control method according to claim 6, further comprising, after the decreasing of the torque of the transmission, monitoring a phase current applied to the electrical oil pump.

* * * * *